(12) United States Patent
Benet et al.

(10) Patent No.: US 9,944,459 B2
(45) Date of Patent: Apr. 17, 2018

(54) MANWAY LID GASKET

(71) Applicants: Stephen E. Benet, Friendswood, TX (US); James E. B. Frew, Kingsport, TN (US); Thomas P. Lokey, Elkton, MD (US); Daniel F. Reid, Kingwood, TX (US); Alfred Fitzgerald Waterland, III, Chesterfield, VA (US)

(72) Inventors: Stephen E. Benet, Friendswood, TX (US); James E. B. Frew, Kingsport, TN (US); Thomas P. Lokey, Elkton, MD (US); Daniel F. Reid, Kingwood, TX (US); Alfred Fitzgerald Waterland, III, Chesterfield, VA (US)

(73) Assignee: Virginia Sealing Products, Inc., Prince George, VA (US)

( * ) Notice: Subject to any disclaimer, the term of this patent is extended or adjusted under 35 U.S.C. 154(b) by 49 days.

(21) Appl. No.: 14/715,766

(22) Filed: May 19, 2015

(65) Prior Publication Data

US 2015/0329284 A1 Nov. 19, 2015

Related U.S. Application Data

(60) Provisional application No. 62/000,032, filed on May 19, 2014.

(51) Int. Cl.
*B65D 90/10* (2006.01)
*B65D 53/02* (2006.01)
(Continued)

(52) U.S. Cl.
CPC ............... *B65D 90/10* (2013.01); *B61D 5/08* (2013.01); *B65D 53/02* (2013.01); *F16J 15/122* (2013.01);
(Continued)

(58) Field of Classification Search
CPC ........ F16J 15/022; F16J 15/024; F16J 15/025; F16J 15/104; F16J 15/121; F16J 15/122;
(Continued)

(56) References Cited

U.S. PATENT DOCUMENTS 3,595,589 A * 7/1971 Henderson ............. F16J 15/123
277/601
4,934,715 A * 6/1990 Johnson .................. E02D 29/14
220/378
(Continued)

FOREIGN PATENT DOCUMENTS

DE 2507463 9/1976
EP 0915273 5/1999

OTHER PUBLICATIONS

International Application No. PCT/US2015/031512; Notification of Transmittal of the International Search Report and the Written Opinion of the International Searching Authority; 12 pages; dated Aug. 20, 2015.
(Continued)

*Primary Examiner* — Nicholas L Foster
(74) *Attorney, Agent, or Firm* — John H. Thomas, P.C.

(57) ABSTRACT

A manway lid gasket is an annular gasket that has top and bottom surfaces between the inside diameter and outside diameter of the gasket. Each of the top and bottom surfaces includes a concave, circumferential groove therein. Additionally, the gasket has a radial cut out that extends from the outside diameter face partway through the radial width of the gasket and has an annular corrugated metal insert positioned therein.

11 Claims, 7 Drawing Sheets

(51) Int. Cl.
*F16J 15/02* (2006.01)
*F16J 15/12* (2006.01)
*B65D 90/00* (2006.01)
*F16J 15/10* (2006.01)

(52) U.S. Cl.
CPC ............ *F16J 15/022* (2013.01); *F16J 15/024* (2013.01); *F16J 15/104* (2013.01)

(58) Field of Classification Search
CPC ........... B61D 5/08; F16L 23/22; B65D 90/10; B65D 53/02; E02D 29/149
See application file for complete search history.

(56) References Cited

U.S. PATENT DOCUMENTS

| | | | | |
|---|---|---|---|---|
| 5,556,113 A | * | 9/1996 | Amorese | F16J 15/104 |
| | | | | 277/608 |
| 5,558,347 A | * | 9/1996 | Nicholson | F16J 15/00 |
| | | | | 277/652 |
| 5,797,604 A | * | 8/1998 | Inagaki | F16J 15/0893 |
| | | | | 277/618 |
| 6,824,140 B2 | * | 11/2004 | Frew | F16J 15/122 |
| | | | | 277/637 |
| 8,166,891 B2 | * | 5/2012 | Borowski | B61D 5/08 |
| | | | | 105/377.05 |
| 8,196,523 B2 | * | 6/2012 | Blevins, Jr. | B29C 43/027 |
| | | | | 105/377.05 |
| 8,397,646 B2 | * | 3/2013 | Blevins, Jr. | B29C 43/027 |
| | | | | 105/377.05 |
| 9,637,142 B2 | * | 5/2017 | Reiling | B61D 5/08 |
| 2004/0108660 A1 | * | 6/2004 | Frew | F16J 15/122 |
| | | | | 277/628 |
| 2006/0181032 A1 | * | 8/2006 | Riggs | F16J 15/122 |
| | | | | 277/627 |
| 2010/0282124 A1 | * | 11/2010 | Blevins, Jr. | B29C 43/027 |
| | | | | 105/377.05 |
| 2011/0107940 A1 | * | 5/2011 | Borowski | B61D 5/08 |
| | | | | 105/377.05 |
| 2012/0240815 A1 | * | 9/2012 | Blevins, Jr. | B29C 43/027 |
| | | | | 105/377.08 |

OTHER PUBLICATIONS

Archon Industries, Inc. brochure; released Jan. 2013; 6 pages.
James Walker Tank Container Sealing Guide; Issue 1.2; 12 pages.
Fort Vale; Manlid Catalogue; 28 pages.
International Preliminary Report on Patentability; International Application Serial No. PCT/US2015/031512; dated Nov. 22, 2016; 7 pages.

* cited by examiner

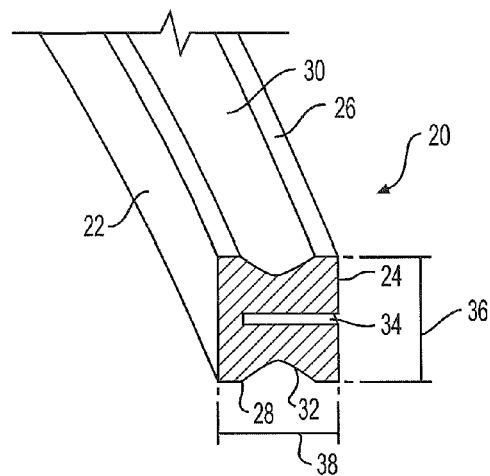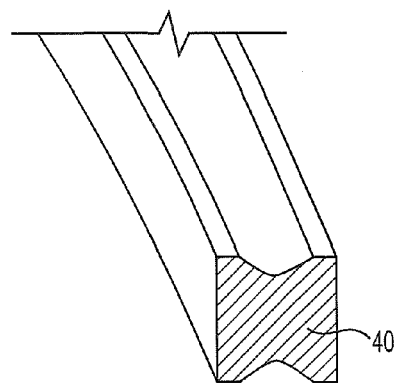
FIG. 2  FIG. 2A
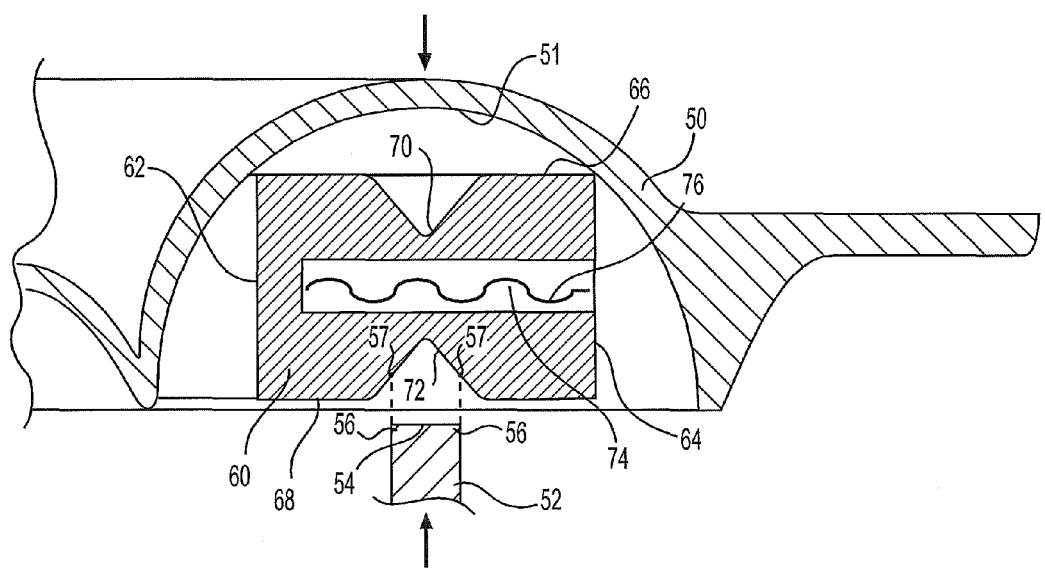
FIG. 3

EXISTING GASKET TEST RESULTS

| FT.LBS. | PSIG | SOAK(MIN) | DWELL(MIN) | PASS | FAIL |
|---|---|---|---|---|---|
| | | WHITE RUBBER | | | |
| 40 | 30 | 15 | 15 | X | |
| | OPEN, RE-TORQUE, REPEAT | | | | |
| 40 | 30 | 15 | 15 | | X |
| 50 | 30 | 15 | 15 | | X |
| 60 | 30 | 15 | 15 | | X |
| 70 | 30 | 15 | 15 | | X |
| 80 | 30 | 15 | 15 | | X |
| 90 | 30 | 15 | 15 | | X |
| 100 | 30 | 15 | 15 | | X |
| | | | | | |
| | | EPDM | | | |
| 40 | 30 | 15 | 15 | | X |
| 50 | 30 | 15 | 15 | | X |
| 60 | 30 | 15 | 15 | | X |
| 70 | 30 | 15 | 15 | X | |
| | OPEN, RE-TORQUE, REPEAT | | | | |
| 70 | 30 | 15 | 15 | X | |
| | OPEN, RE-TORQUE, REPEAT | | | | |
| 70 | 30 | 15 | 15 | | X |
| 80 | 30 | 15 | 15 | | X |
| 90 | 30 | 15 | 15 | | X |
| 100 | 30 | 15 | 15 | | X |
| | | | | | |
| | FORT VALE (ENCAPSULATED RED) | | | | |
| 30 | 30 | 15 | 15 | | X |
| 40 | 30 | 15 | 15 | | X |
| 50 | 30 | 15 | 15 | X | |
| 50 | 30 | 5:00PM - 7:00AM | | X | |
| | BACKED OFF 1/4 TURN | | | | |
| 50 | 30 | 15 | 15 | | X |
| | OPEN, RE-TORQUE, REPEAT | | | | |
| 50 | 30 | 15 | 15 | | X |
| GASKET IS STAMPED 50FTLBS, MAX A LEAK, I DID LIKE AN OPERATOR | | | | | |
| 60 | 30 | 15 | 15 | | X |
| 70 | 30 | 15 | 15 | | X |

*FIG. 6*

EXISTING GASKET TEST RESULTS, CONTINUED

| FT.LBS. | PSIG | SOAK(MIN) | DWELL(MIN) | PASS | FAIL |
|---|---|---|---|---|---|
| | | | | | |
| | HALO PTFE (WHITE) | | | | |
| 40 | WOULD NOT HOLD PRESSURE | | | | X |
| 50 | WOULD NOT HOLD PRESSURE | | | | X |
| 60 | WOULD NOT HOLD PRESSURE | | | | X |
| 70 | WOULD NOT HOLD PRESSURE | | | | X |
| 80 | WOULD NOT HOLD PRESSURE | | | | X |
| 90 | WOULD NOT HOLD PRESSURE | | | | X |
| 100 | WOULD NOT HOLD PRESSURE | | | | X |
| 110 | WOULD NOT HOLD PRESSURE | | | | X |
| | | | | | |
| | FORT VALVE (SUPER TIGHT) | | | | |
| 40 | 30 | 15 | 15 | | X |
| 50 | 30 | 15 | 15 | | X |
| 60 | 30 | 15 | 15 | X | |
| | BACKED OFF 1/4 TURN | | | | |
| 60 | 30 | 15 | 15 | | X |
| | OPEN, RE-TORQUE, REPEAT | | | | |
| 60 | 30 | 15 | 15 | X | |
| 60 | 30 | 15 | 15 | X | |
| 60 | 30 | 15 | 15 | | X |
| 70 | 30 | 15 | 15 | | X |
| 80 | 30 | 15 | 15 | X | |
| | BACKED OFF 1/4 TURN | | | | |
| 80 | 30 | 15 | 15 | | X |
| | OPEN, RE-TORQUE, REPEAT | | | | |
| 80 | 30 | 15 | 15 | | X |
| | HAMMER TORQUE | | | | |
| 60-90 | 30 | 15 | 15 | | X |

*FIG. 6*
*CONTINUED*

NEW GASKET SAMPLE TEST RESULTS

| FT.LBS. | PSIG | SOAK(MIN) | SWELL(MIN) | PASS | FAIL |
|---|---|---|---|---|---|
| 40 | 30 | 15 | 15 | | X |
| 50 | 30 | 15 | 15 | | X |
| 60 | 30 | 15 | 15 | X | |
| 70 | 30 | 15 | 15 | X | |
| 70 | 30 | 15 | 15 | X | |
| 60 | 30 | 60 MINUTES | | X | |
| 60 | 30 | 15 | 15 | X | |
| 60 | 30 | 15 | 15 | X | |
| 50-90 | 30 | 15 | 15 | X | |
| | | FLIPPED GASKET OVER | | | |
| 50 | 30 | 15 | 15 | | X |
| 60 | 30 | 15 | 15 | X | |
| 60 | 30 | 15 | 15 | X | |
| | | BACKED OFF BOLTS 1/4 TURN | | | |
| 60 | 30 | 15 | 15 | | X |
| 70 | 30 | 15 | 15 | X | |
| | | BACKED OFF BOLTS 1/4 TURN | | | |
| 70 | 30 | 15 | 15 | X | |
| | | REMOVED GASKET, INSTALLED 1/16 SPACER | | | |
| 50 | 30 | 15 | 15 | | X |
| 60 | 30 | 15 | 15 | | X |
| 70 | 30 | 15 | 15 | X | |
| 70 | 30 | 15 | 15 | X | |

*FIG. 7*

MANWAY LID GASKET

This application claims the benefit of filing of U.S. Provisional Patent Application Ser. No. 62/000,032, filed May 19, 2014 entitled "MANWAY LID GASKET," which is incorporated herein by reference in its entirety.

The present invention relates to gaskets for use in sealing the closure of manways of bulk containers for shipping liquids, gas or other materials.

BACKGROUND

The shipment of liquid materials by ISO bulk liquid containers started in the late 1960's. Over the past 50 years, the use of these containers has grown exponentially. What started as an efficient way to ship wine and liquor now includes hazardous and nonhazardous materials, for instance everything from crude oil products to the most dangerous PIH (poison inhalation hazard) products shipped around the world every day.

The design of these containers has changed slightly over the years, but what has remained consistent is the inclusion of a manway. The manway can be located on the top, sides, or ends of the container. The manway is used by operations for loading, and off-loading purposes. (A manway is often also referred to as a manlid, and those terms are used interchangeably herein.) For this reason, the manway/manlid can potentially be opened and closed every time a container is sent to, or used by an operator.

A typical manlid has stainless steel clips that hold swing bolts in place for closure. The elements of this design make it a bolted connection. Additional manway/manlid sealing systems also employ bolts in different configurations known to those of skill in the art. Little thought has been given to the gasket design, torque values, or fasteners that will provide the necessary gasket stress required in effectively and reliably sealing this connection. Historically, and currently the tool of choice to tighten a manlid is a hammer, with no thought given to torque values, or a crisscross torque pattern to bring the gasket down evenly on the connection to ensure consistent gasket stress across the manlid. In many cases these welded stainless clips cause the manlid to warp and distort slightly causing a rather uneven gasket groove. The manway collar is a plate rolled to the proper diameter with a welded seam; the collar also has sixteen clips welded to the outside diameter, two clips for each of the eight swing bolts. The manway collar also warps and distorts during fabrication and is not a machined surface. The design and fabrication process leaves a narrow sealing surface area that is typically not flat or perfectly round. Because of this fabrication process, no two manway fixtures are exactly the same and may be/become out of design tolerances with manufacturers' desired measurements after units are entered into service.

A typical manlid is hinged to the manway collar allowing it to be opened and closed as needed. The manlid is secured to the manway by swing bolts (for example 6-10 bolts) that are also designed to allow the cover to be opened and closed as necessary. The manlid is fitted with a gasket to prevent liquid and vapors from being released. Historically these manlid connections have been the weakest, most vulnerable connection on—bulk liquid containers. Over the many years of its use in the industry many different types of gasket materials and designs have been used to try and accomplish a leak free, reliable seal. Although the development and introduction of new materials have had some positive impact, the shape and basic design of the gasket has remained the same, and none has considered the importance of seal tightness or torque retention in this bolted connection. Consequently, the manlid cover connection is still the most vulnerable and troublesome connection on today's bulk liquid containers.

The shape and design of the manlid connection poses challenges in trying to achieve a reliable, sustainable leak free liquid and vapor seal. The shape of the manlid groove causes a soft or ill-fitting gasket to roll towards the inside of the manway collar. The depth of the groove and the short height profile of the manway collar do not allow for full engagement of the two surfaces when the manlid is in the closed position without a gasket installed. The wide width of the manlid groove and the thin width of the manway collar make for a very narrow sealing surface. All of these factors have over the years made this unique bolted connection a trouble spot for leaks in the industry. Considering the multiple vibration cycles these containers are exposed to during transport, the frequency that the covers are opened and closed, the desirability of reusing the gasket, and the poor, uncontrolled assembly procedures and tools that are used, it can be seen that all these detrimental attributes are exacerbated.

Currently in the industry there are several gasket designs and materials commonly being used. All are of a flat or round design shape which allows only one point of gasket contact with the manway sealing surface. The gaskets are made of an elastomer, PTFE, or a combination of the two materials. Although each gasket type has been used for many years in the industry, no current design shape or material gasket has taken into consideration all the necessary elements of this flanged bolted connection to provide the industry with a gasket that consistently achieves a complete reliable liquid and vapor seal for the hazardous and lethal commodities being transported in—bulk containers globally today. The relatively wide manlid gasket groove and narrow sealing surface of the manway collar allows the collar to embed itself into the flat or round surface of the gasket designs used today. By doing so the narrow collar will deform, split, or delaminate the gasket's sealing surface. Operators open and close the manlid often to load, or off-load this equipment. The flat or round design of currently used gaskets, do not allow the gasket to capture the collar in the exact relative location each time to ensure a repeatable reliable seal. Instead, the sealing surface on the collar wanders and tries to seal itself over the deformations, splits, and delaminations caused by the previous closure. This creates leak paths and makes it difficult if not impossible to reseal, making the gasket useless after only one or two uses. Additionally, many users of the—bulk containers are located in remote areas or areas where parts are not easily accessible.

Existing types of gaskets including the following:

1) White Nitrile Buna (N)

This gasket has been around in one form or another for many years. The biggest deterrent of this elastomer is its low chemical resistance, its low heat tolerance, its low maximum compressive stress limits and its poor torque retention properties. The narrow sealing surface on the manway collar and flat gasket surface allows for only a small one point of contact sealing surface. The creep and cold flow properties of rubber cause the connection to relax and lose the gasket stress necessary to seal the connection. When tightened over and over to maintain gasket stress the manway collar embeds itself deeper and deeper into the gasket surface causing deformation and splits. When this occurs the gasket is damaged and successful re-use is very unlikely. In addition, this gasket is difficult to install, and very difficult to remove, and has limited dual side use capabilities.

2) EPDM

Similar to sweet white rubber, this gasket also has low chemical resistance properties, low heat tolerance, and low torque retention properties. Its color (black) and lack of markings make it very difficult to identify from other black rubber gaskets. The flat design shape of this gasket allows for only one point of contact with the narrow sealing surface of the manway collar. The flat surface allows the manway collar's narrow sealing surface to wander, not providing a reliable, repeatable sealing area. The creep and cold flow properties of the material cause the gasket to relax, and lose the gasket stress necessary for a sustainable connection. When tightened more and more in the attempt to get the connection to seal, the narrow manway collar embeds itself deeper into the pliable gasket material causing deformation and splitting of the material. When this occurs, the gasket is destroyed and any successful re-use is unlikely. This gasket is fairly easy to install, but very difficult to remove after use, and has limited dual side use capabilities.

3) Hollow Core PTFE

The hollow core PTFE gasket is joined on one end with a smaller diameter tube that inserts into the other end allowing it to be used on multiple size covers. This gap allows a pathway for liquid and vapor to escape. The PTFE material makes the gasket chemically resistant; however, this gasket is not user friendly. It is hard to install and very difficult to remove. If not properly cut and installed, the leak potential is exacerbated. The round shape and hollow design of the gasket, coupled with the wide manlid gasket groove, and the narrow seating surface of the manway collar make it difficult to get a reliable liquid and vapor seal. This gasket provides only one point of contact with the narrow manway collar sealing surface, and provides no spring back, or live action to ensure torque retention during the vibration cycles seen during transport. The manway collar sealing surface embeds itself into the gasket, and the hollow core causes the gasket to collapse upon compression. This collapse may cause the gasket to split creating potential leak paths. The design of the manway does not allow for full engagement of the manway collar into the manlid groove. This means that when fully closed, there is a gap between the top of the manway collar and the bottom of the manlid groove. With the hollow core design of this gasket, and the shorter, narrow sealing surface of the collar, there are points in the connection that do not reach the gasket stress necessary to provide a reliable sustainable liquid and vapor seal regardless of how much the connection is tightened. The gasket design causes deformation and splitting of the material to occur, destroying the gasket and making any re-use of the gasket unlikely. In addition, the gasket is difficult to install correctly, and it has no dual side use capabilities.

4) PTFE Encapsulated Silicone

This gasket is a PTFE encapsulated elastomeric type. It is a thin flat design that fits into the manlid groove. The flat surface allows the manway collar's narrow sealing surface to wander. The narrow manway collar sealing surface embeds into the gasket which can cause the thin PTFE layer of encapsulation to split creating leak pathways and chemical incompatibility issues. Once split, the commodity is free to attack the elastomer and degrade the gasket. The elastomer core creep and cold flow properties cause relaxation of the connection making re-torque necessary. This gasket is very hard to install correctly at the correct assembly torque range. Once removed the gasket is of no further use, and has no dual side use capabilities.

5) Molded PTFE Enveloped Elastomer

This gasket is a PTFE wrapped elastomeric type. It is a flat design that fits into the manlid groove. The elastomer is wrapped in a thin PTFE layer with seams that extend around both the ID and OD of the gasket at the top and bottom. The flat gasket design allows the narrow manway collar sealing surface to wander across the gasket surface. The narrow sealing surface embeds itself into the gasket deforming the gasket making any reliable re-use of the gasket unlikely. The gasket design does not provide any spring back, or lively action to ensure proper gasket stress during the vibration cycles seen during transport. The narrow manway collar sealing surface wandering across the flat gasket surface, and the collar embedding itself into the gasket material causes the PTFE wrap to delaminate at the corners. Once this delamination occurs, the commodity is free to attack and degrade the elastomer creating leak pathways, destroying the gasket, and minimizing any successful re-use. The gasket is fairly easy to install, but very difficult to remove, and has no dual side use capabilities.

SUMMARY

Accordingly, it is an object of the present invention to provide a manlid gasket that is designed for repeat use and has the ability to be turned over and used again as new and is chemically compatible to most products. This gasket is beneficial to an operator whose main concern is a safe, reliable, leak-free container, and an uninterrupted supply chain.

In one example, a manway lid gasket comprises an annular gasket having a radial width defined by the difference between an inside diameter and outside diameter of the gasket and a height. The gasket has top and bottom surfaces with the distance there between defining the height of the gasket, and an inside diameter face and an outside diameter face. Each of the top and bottom surfaces comprises a concave, circumferential groove therein. Alternatively, the inside diameter face is solid, and the outside diameter face has a radial cut out therein that extends only partway into and through the radial width of the gasket. The outside diameter face may be solid, and the inside diameter face has a radial cut out therein that extends only partway into and through the radial width of the gasket. An annular corrugated metal insert is positioned in the radial cut out open to the outside diameter face, or alternatively, inside diameter face. The concave, circumferential grooves may be V-shaped grooves or U-shaped grooves that extend across a portion of the radial width of the top and bottom surfaces of the gasket. The V-shape or U-shape may be generally symmetrical in cross-section. The radial cut out may be positioned at approximately the middle of the height of the gasket and may extend from the outside diameter face inwardly to at least about 50% of the radial width of the gasket. The metal insert may have at least two corrugations in its cross section.

BRIEF DESCRIPTION OF THE DRAWINGS

FIG. 2 is a partial, cross-sectional perspective view of a portion of the manway lid gasket described herein.

FIG. 2A is a partial, cross-sectional perspective view of a portion of an alternative manway lid gasket described herein.

FIG. 3 is a side, cross-sectional view of a manway lid gasket described herein positioned inside the groove on a manway lid and also displaying the top of the manway opening nozzle.

FIGS. 6 and 6 Continued are test results with respect to the functionality of prior art gasket configurations.

FIG. 7 is a chart demonstrating test results with respect to the functionality of a gasket as described herein.

DETAILED DESCRIPTION

Figure 1:
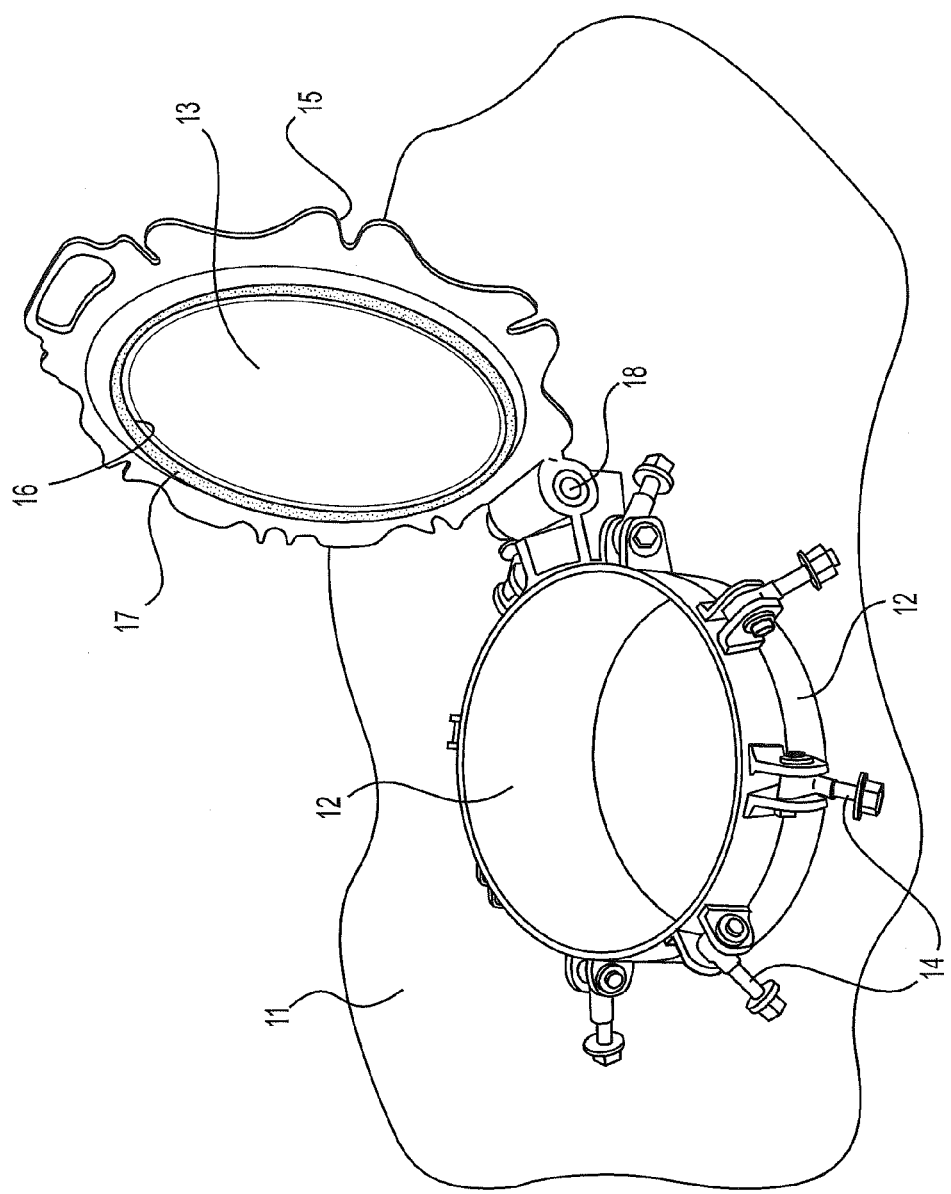
FIG. 1 is a perspective view of a typical manway opening and lid cover apparatus.

Recognizing the need for a dependable, reliable, leak free-manway connection, a manlid gasket was specifically designed to address the current industry issues. The gasket is designed in a way that does not allow the manway collar to wander across the face of the gasket surface, but instead captures the manway collar in a V-groove which allows it to repeatedly provide a sustainable seal through multiple usages between a manlid and a typically uneven, not perfectly round, un-machined manway collar. The gasket can have a solid PTFE material that gives it excellent chemical compatibility, and a corrugated metal insert positioned inside and as a part of the gasket gives the gasket high torque retention and enables the gasket to retain necessary gasket stress through foreseeable container transport vibration cycles. The gasket is easy to install, easy to remove, and can be used on one side, and then turned over to the other side for continued use. These characteristics make it far different from and superior to any other gasket in the industry.

A high profile or height of the gasket allows the gasket to stand tall in a manlid groove allowing it to better contact and align with the collar. In one example, the height of the gasket is 0.52 inch. Depending on a given application, gasket material and groove geometry, the gasket may be about 0.25 to 0.75 inch in height. The V-groove (on both the top and bottom surfaces of the gasket) allows the gasket to capture the irregular shape of the collar. The V-shape can be a straight-line V and can be symmetrical. Some curvature of cross-sectional shape and some asymmetry is also alternatively possible. All of these alternatives are intended in the term V-groove. With the V-groove defined by both the top and bottom surfaces, the gasket can be easily be removed and flipped over for extended use. Comparatively, where a flat or round gasket has one point of sealing contact, a V-groove has two points of contact between the gasket and sealing surface to better ensure a reliable seal.

An optional side cut out in the gasket allows a corrugated metal insert to be installed. This corrugated metal insert acts as a "spring" giving the gasket a live action that allows the gasket to retain compression through the multiple vibration cycles the container will experience during transportation without losing the necessary gasket stress required for a reliable seal. The metal insert has three corrugations that span the width of the gasket to ensure full engagement across the face of the gasket regardless of which side is being used, helping to further ensure a long term reliable leak free connection. At least one corrugation is needed, while two or more are preferred. The number of corrugations is limited by the radial width of the insert.

This gasket is easy to install, easy to remove and has the unique ability to be used on both sides. This is valuable to operations, particularly operations located in remote areas or areas where finding and sourcing the proper gasket can be challenging and create costly delays in returning the tank to service. With the unique design properties of this gasket, when the side in service is used, and re-used to a point where it no longer provides adequate leak protection, the operator can simply remove the gasket, flip it over, and continue to ship the container knowing he/she has a safe, reliable repeatable liquid and vapor seal with no disruption to the supply chain.

FIG. 1 illustrates a perspective view of the environment in which a manway lid gasket will be deployed. A tank 11 includes a manway collar 12 welded to the top thereof. The tank referenced herein can refer to all bulk transport equipment including, but not limited to, ISO tanks, frack tanks, road tanks, tank trailers, storage tanks, vacuum truck tanks, and roll on/roll off tanks. The collar 12 includes several swing bolts 14 welded onto it. The manway lid 13 is connected by a hinge 18 to the manway collar 12. The lid 13 includes slots 15 where the swing bolts 14 are positioned and then may be tightened. There is also a manway lid groove 16 into which a manway lid gasket 17 is placed to seal the connection between the manway lid 13 and the collar 12.

FIG. 2 is a cross-sectional view of a portion of a manway gasket 20. Clearly, the complete manway gasket 20 is an annular solid circle that would fit into a manway lid groove such as the groove 16 shown in FIG. 1. The gasket 20 has an inside diameter face 22 and an outside diameter face 24. The top face 26 of the gasket 20 includes a V-shaped groove 30. The bottom face 28 of the gasket 20 also has a V-shaped groove 32. The height 36 or thickness of the gasket 20 is the distance between the top face 26 and bottom face 28. The radial width 38 of the gasket 20 is the distance from the inside diameter face 22 and the outside diameter face 24. In this example, the gasket also illustrates a radial cutout 34 that is open to the outer diameter face 24 of the gasket 20. The cutout 34 extends only partially through the width 38 of the gasket 20. An annular corrugated metal insert (not pictured) may be placed in the cutout 34. Although not shown, a radial cut out may be similarly formed in gasket and open to the inside diameter face of a gasket.

FIG. 2A displays a gasket 40 that is similar to the gasket 20 of FIG. 2, except the gasket 40 is monolithic and solid in its cross section. A further alternative, not shown, would be a gasket that is monolithic and hollow in its cross section.

Turning to FIG. 3, there is shown a side, cross-sectional view of a gasket 60 mounted in a manway lid groove 51. The manway lid 50 defines the groove 51 proximate its outside diameter as shown in FIG. 1. The groove 51 has a U-shape or semi-circular shape cross-section. This groove may also be V-shaped or rectangular shaped or otherwise an asymmetric shape. A manway collar 52 is shown as having a generally rectangular cross-section with a top surface 54 defining top corners 56 of that collar. The gasket 60 includes an inside diameter face 62 and outside diameter face 64. The top surface 66 of the gasket 60 includes a V-shaped groove 70. The bottom surface 68 of the gasket 60 includes a V-shaped groove 72. A radial cutout 74 has a corrugated metal insert 76 mounted therein. As illustrated by the movement of the arrows in FIG. 3, the manway collar 52 will engage the V-shaped groove 72 at two points 57 along that groove when the lid is closed over the manway collar.

Figure 5A:
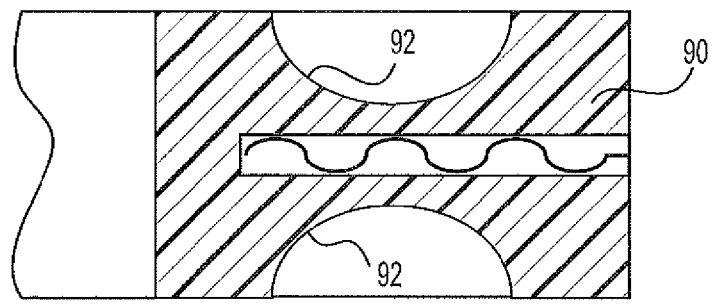
FIGS. 5A-5C are side, cross-sectional views of alternative constructions of a manway lid gasket as described herein.
Figure 5B:
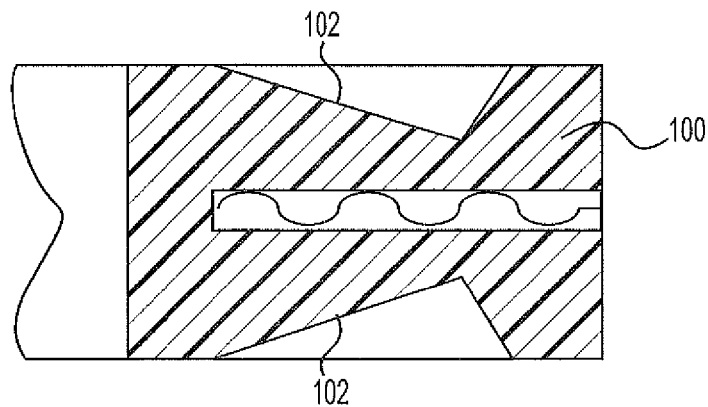
Figure 5C:
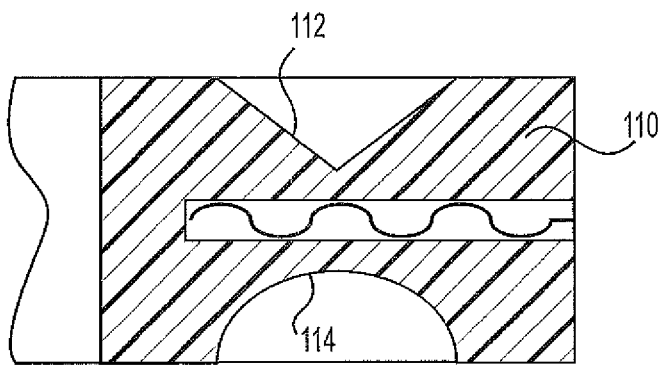

FIGS. 5A-5C illustrates alternative geometries of various gasket configurations. In FIG. 5A, the manway lid gasket 90 includes U-shaped grooves 92 on the top and bottom thereof. The U-shaped grooves 92 are symmetrical and centered along the radial width of the gasket 90. In FIG. 5B, a gasket 100 includes asymmetrical V-shaped grooves 102 that are cut more toward the outside diameter of that gasket 100. FIG. 5C illustrates a gasket 110 having a V-shaped top groove 112 and a U-shaped bottom groove 114 centered on the top and bottom surfaces thereof. These Figures are simply alternative illustrations of the numerous geometries of the grooves that may be configured in the top and bottom surfaces of the new gasket described herein.

An example of the gasket described herein was tested for functional reliability. The testing results of this new gasket are set forth in FIG. 7. The specifications of this new gasket are set forth in the following Table 1 in the "as tested" column. Table 1 also provides another column for alternative ranges that may be used to engineer a gasket as described herein.

TABLE 1

Gasket Dimension Table (As Tested/Alternative Ranges)

| All Dimensions to Be Plus or Minus 0.005 Inch | New Gasket As Tested | Alternative Ranges |
|---|---|---|
| Groove depth | 0.062 inch | 0.01325 inch/ 0.125 inch |
| Groove shape | V-groove | V-groove |
| Degree of V-groove angle | 23.74° | About 10 to 45° |
| Groove location | Centered | Centered |
| Insert or not | Both | Both |
| Reversible | Yes | Yes |
| Thickness | 0.520 inch | 0.375 inch/ 0.625 inch |
| Shoulder width | 0.100 inch | 0.100 inch (plus or minus 0.005 inch) |
| Inside diameter | 19.300 inches | 16.500 inches |
| Outside diameter | 20.263 inches | 22.500 inches |
| Cross-section of gasket | 0.482 inch | 0.375 inch/ 0.625 inch |
| Inside diameter of slot for corrugated metal insert | 19.575 inches | 16.775 inches |
| Outside diameter of slot for corrugated metal insert | 20.263 inches | 22.500 inches |
| Cross-section of slot | 0.344 inch | 0.237 inch/ 0.487 inch |
| Elevation of slot bottom | 0.24 inch | 0.1875 inch/ 0.3125 inch |
| Inside diameter of corrugated metal insert | 19.638 inches | 16.800 inches |
| Outside diameter of corrugated metal insert | 20.263 inches | 22.500 inches |
| Groove opening | 0.040 inch | 0.040 inch (plus or minus 0.005 inch) |
| Reversible | Yes | Yes |

The manway lid gasket as described herein has a number of unique design features to specifically address the challenges posed by a manway lid/manway collar connection.

Height/Thickness: The gasket height or thickness of 0.520 inch fitted into the dished bottom 0.625 inch deep manlid gasket groove allows the gasket to stand high in the manlid groove. When fully closed, the manway collar engages the manway lid approximately 0.1875 inch making the thickness of the gasket a critical feature in allowing for full engagement contact of the manway collar into the gasket surface. The thickness (0.520"), dished bottom (0.625"), and approximate engagement (0.1875") are correct for the Fort Vale lid as tested. However, the dished bottom found on the Fort Vale lid is not found on other manufactured lids, for instance by Perolo and Swift. Other lids may have a more flat bottom groove with a small radius. In addition, the groove heights are different, one being shallow, and one being relatively deep. This changes the engagement, however, that engagement is still adequate to provide a reliable seal.

V-Groove: The typical fabricated design of the approximately 0.250 inch wide manway collar causes the sealing surface to be uneven, the width to be irregular, and the collar to not be perfectly round. The manway lid gasket as described herein has a V-groove cut into the center cross-section of the gasket on the top and bottom surfaces. The V-groove is cut with approximately a 0.100 inch shoulder on each side, and an angle of approximately 23.74°. The V-groove is designed to capture the irregular shape of the manway collar, and allow it to seat itself in the same position over multiple opening and closing cycles. Without the V-groove, the collar can wander across the surface of a flat or round gasket allowing it to seat in multiple locations across the gasket face. By doing so, ridges and valleys are formed across the gasket face creating leak paths.

Center Slot: A cut out is located in about the center of the gasket height thickness. This cut out is to accommodate a corrugated metal insert. The slot is cut to a nominal height 0.005 inch larger than the overall thickness of the metal insert. The slot is cut to an inside diameter 0.140 inch larger than the inside diameter of the gasket, and approximately 0.063 inch deeper than the cross-section of the metal insert. This is to allow room for the corrugated metal insert to flex without binding or distorting. The cut out is illustrated in the drawings as being open to the outside diameter face of the gasket. It is also alternatively possible that the cut out could instead be open to the inside diameter of the gasket with the outside diameter of the cut out being less than the outside diameter of the gasket.

Corrugated Metal Insert: A corrugated metal insert (0.018 inch to 0.024 inch 316SS corrugated 0.125 inch pitch, 0.040 inch plus or minus 0.005 inch overall height) is installed in the center slot of the gasket. The dimensions of the corrugated metal insert will vary depending upon the cross-section of the gasket. The metal insert is generally 316SS, or in some cases when additional chemical compatibility is required may be Hastelloy®. These materials were chosen because of their ability to retain the necessary corrugations, even through multiple compression cycles. Other metals and alloys and polymers and composites thereof may be suitable insert materials. At least two corrugations in the cross-section of the metal insert are preferred. The corrugated metal insert gives the gasket a "dynamic spring back" action. This design feature allows the gasket to more easily achieve the gasket stress necessary for a reliable liquid and vapor seal, and is imperative to retaining adequate gasket stress through the vibration cycles seen by the equipment during transport.

The gasket material can be virgin or mechanical grade PTFE. PTFE has excellent chemical compatibility and resiliency properties which make it a good choice in the industry. Other materials may be used with this design if specific material requirements are needed. Other materials include expanded PTFE, porous PTFE, filled PTFE, elastomers, graphite and/or carbon, ceramic and soft metals including copper, and combinations of the foregoing.

On a typical manway gasket connection in the industry, the relatively flat sealing surface of the manway collar contacts the flat surface of the manlid gasket. This connection allows only one point of sealing contact, one flat surface against another flat surface. When opening and re-closing the manlid, the two flat surfaces will slide and may never find the same position on the sealing/seating surface twice. This causes ridges, and irregularities on the gasket surface creating potential leak paths. The manway lid gasket design with a V-groove allows the manway collar to slide into place capturing the collar in the V-shaped groove. When opening and re-closing the manlid, the manway collar will always slide back into the V-groove allowing it to seat in the same spot without creating ridges and irregularities that act as leak pathways. This connection allows two points of contact between the manway collar, and the manlid gasket. The right and left corners of the manway collar make contact with the V-groove when the manlid is closed creating two points of contact which help ensure a reliable seal, and also creating a higher contact stress at each of these contact points; again enhancing the sealing capability of the connection.

Figure 4:
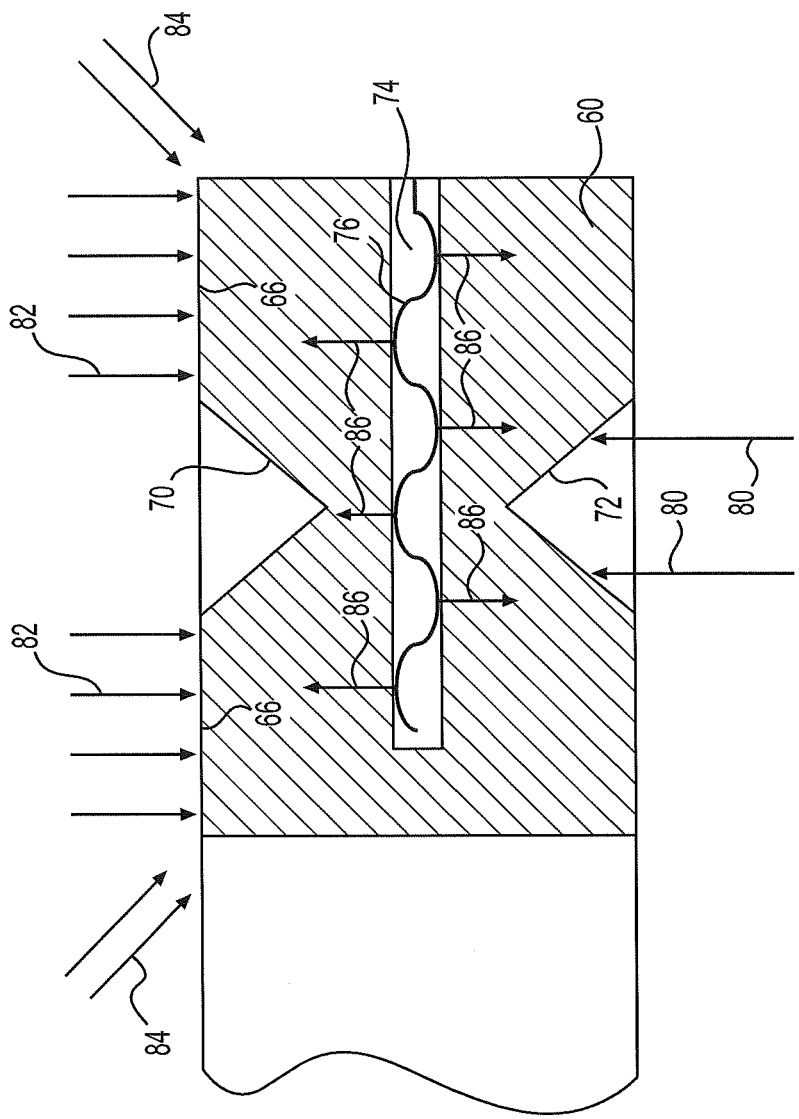
FIG. 4 is a side view of a cross-section of a manway lid gasket as described herein demonstrating the forces exerted on the gasket as shown for instance in FIG. 3.

A secondary benefit of the gasket shape is the location and magnitude of the sealing and reactive forces exerted onto and by the gasket when it is installed in the rounded-base manway cover groove and closed against the narrow surface of the collar. These forces are illustrated in FIG. 4 as illustrating those forces on the gasket 60 in FIG. 3. The narrow collar extending from the tank contacts the side walls of the V-groove 72 creating point loading 80 on opposite sides of the groove. The contact stress by which a seal is developed is greatly magnified by this narrow point loading, allowing for effective, tight sealing at lower bolt torque. These collar forces 80 are transmitted through the body of the gasket 60 which flattens out the corrugation in the insert 76 which creates potential energy 86 as the compressed corrugations are trying to "spring back" to their original shape. At the base of the manway lid groove, the narrow base legs are easily deformed 82 to match the groove radius and concentrate the transmitted forces 84 across a smaller area, increasing contact stress and again allowing for a lower torque seal at the base of the manway lid groove.

Testing was performed to the manway lid gasket as described herein, and five common manlid gaskets used in the industry today: Sweet White Rubber (white nitrile buna); EPDM; hollow core round cross section virgin PTFE; PTFE Encapsulated silicone (red); and molded PTFE enveloped elastomer.

FIGS. 6 and 7 set forth these performance test results. FIG. 6 illustrates the failures found in using current gasket constructions. FIG. 7 displays the superior performance of the new gasket described herein.

All testing was performed indoors in a controlled environment. All tests were performed using a Fort Vale eight bolt ISO container manway assembly. All tests were performed using the same tools and equipment and followed the same test procedures and criteria.

Tests were based on a simple pass, fail system. To pass a connection, a gasket was required to hold 30 psig for a minimum of 30 minutes with no pressure loss and no bubble leak indications. If either of these criteria were not met, the test failed. Each sample was opened and re-torqued to establish the gaskets ability to be reused. The same pass/fail criteria were followed for this test. If a gasket showed the ability to repeat, the swing bolts were loosened ¼ turn to simulate vibration. The same pass/fail criteria were followed for this test.

It is clear from the test data in FIGS. 6 and 7 that the new manway lid gasket was the only gasket in the test group that was able to provide a consistent reliable seal to the manway fixture over repeated use. It is also the only gasket in the test group that has the ability to be removed, flipped over, reinstalled, and used again on the opposing gasket surface with equally good results. While torque control is the preferred method, it is also the only manway gasket that does not require strict limits on the assembly bolt loading.

Other embodiments of the present invention will be apparent to those skilled in the art from consideration of the specification. It is intended that the specification and Figures be considered as exemplary only, with a true scope and spirit of the invention being indicated by the following claims.

That which is claimed is:

1. A manway lid sealing system comprising:
a bulk shipping container having a manway collar and a manway lid, with a manway lid gasket disposed between the manway lid and the manway collar;
wherein the manway collar has a circular top surface that defines a manway opening and the manway lid has a manway lid groove proximate an outside diameter of the manway lid, and the manway lid groove is adapted to receive the top surface of the manway collar wherein the top surface of the manway collar has a collar width, the manway lid gasket is adapted to be positioned in the manway lid groove and wherein the manway lid groove is under and on at least a part of two sides of the manway lid gasket,
the manway lid gasket comprising:
an annular gasket having a radial width defined by the difference between an inside diameter and an outside diameter of the gasket and a height;
wherein the gasket has a top surface and a bottom surfaces with a distance therebetween defining a height of the gasket, and the gasket has an inside diameter face and an outside diameter face; and
wherein the top surface and the bottom surface each comprises a concave, circumferential groove therein and the concave circumferential groove has a cross-sectional width that is greater than the manway collar width, whereby the groove is adapted to receive the top surface of the manway collar when the manway lid is closed on the manway collar;
further wherein the inside diameter face of the manway lid gasket is solid, and the outside diameter face has a radial cut out therein that extends only part way into and through the radial width of the gasket; and
an annular corrugated metal insert is positioned in the radial cut out, and the radial cut out is open to the outside diameter face;
and further wherein the gasket is monolithic except for the insert.

2. The manway lid gasket as described in claim 1, wherein the concave, circumferential grooves of the manway lid gasket are V-shaped grooves.

3. The manway lid gasket as described in claim 2, wherein each V-shape of each V-shaped groove is generally symmetrical in cross-section.

4. The manway lid gasket as described in claim 1, wherein the concave, circumferential grooves of the manway lid gasket are U-shaped grooves.

5. The manway lid gasket as described in claim 4, wherein each U-shape of each U-shaped groove is generally symmetrical in cross-section.

6. The manway lid gasket as described in claim 1, wherein the radial cut out of the manway lid gasket is positioned at approximately a middle of the height of the gasket.

7. The manway lid gasket as described in claim 1, wherein the radial cut out of the manway lid gasket extends from the outside diameter face inwardly to at least about 50% of the radial width of the gasket.

8. The manway lid gasket as described in claim 1, wherein the metal insert has at least two corrugations in its cross-section.

9. The manway lid gasket as described in claim 1, wherein the gasket is comprised of a material selected from the group consisting of virgin or mechanical grade PTFE, expanded PTFE, porous PTFE, filled PTFE, elastomers, graphite, carbon, and ceramic, and combinations of these materials.

10. The manway lid gasket as described in claim 1, wherein the gasket is comprised of virgin or mechanical grade PTFE.

11. A manway lid sealing system comprising:

a bulk shipping container having a manway collar and a manway lid, with a manway lid gasket disposed between the manway lid and the manway collar;

wherein the manway collar has a circular top surface that defines a manway opening and the manway lid has a manway lid groove proximate an outside diameter of the manway lid, and the manway lid groove is adapted to receive the top surface of the manway collar wherein the top surface of the manway collar has a collar width, the manway lid gasket is adapted to be positioned in the manway lid groove and wherein the manway lid groove is under and on at least a part of two sides of the manway lid gasket, the manway lid gasket comprising:

an annular gasket having a radial width defined by the difference between an inside diameter and an outside diameter of the gasket and a height;

wherein the gasket has a top surface and a bottom surfaces with a distance therebetween defining a height of the gasket, and the gasket has an inside diameter face and an outside diameter face; and wherein the top surface comprises a concave, circumferential groove therein and the concave circumferential groove has a cross-sectional width that is greater than the manway collar width, whereby the groove is adapted to receive the top surface of the manway collar when the manway lid is closed on the manway collar;

further wherein the inside diameter face of the manway lid gasket is solid, and the outside diameter face has a radial cut out therein that extends only part way into and through the radial width of the gasket; and an annular corrugated metal insert is positioned in the radial cut out, and the radial cut out is open to the outside diameter face;

and further wherein the gasket is monolithic except for the insert.

* * * * *